United States Patent [19]

Park et al.

[11] Patent Number: 5,349,864
[45] Date of Patent: Sep. 27, 1994

[54] SYSTEM FOR COMPARING A REFERENCE SIGNAL WITH A FILTERED SIGNAL TO DETECT PRESSURE DISCONTINUITY

[75] Inventors: Kyong M. Park, Thousand Oaks; Niraj Gupta, Moorpark, both of Calif.

[73] Assignee: Kavlico Corporation, Moorpark, Calif.

[21] Appl. No.: 88,172

[22] Filed: Jul. 7, 1993

[51] Int. Cl.⁵ .............................................. G01L 9/12
[52] U.S. Cl. .................. 73/724; 361/283.4; 340/626
[58] Field of Search ............... 361/283.4; 73/724, 718, 73/753; 340/511, 870.21, 626, 611, 614

[56] References Cited

U.S. PATENT DOCUMENTS

| | | |
|---|---|---|
| 4,083,234 | 4/1978 | Aono et al. |
| 4,329,732 | 5/1982 | Kavli et al. |
| 4,388,668 | 6/1983 | Bell et al. |
| 4,617,607 | 10/1986 | Park et al. .................. 73/724 X |
| 4,928,255 | 5/1990 | Brennecke et al. ............. 340/626 X |

*Primary Examiner*—Richard E. Chilcot, Jr.
*Assistant Examiner*—Joseph L. Felber
*Attorney, Agent, or Firm*—Poms, Smith, Lande & Rose

[57] ABSTRACT

A simple, reliable, compact and inexpensive fluid pressure discontinuity analysis system includes a basic capacitive pressure transducer, made of two closely spaced insulating plates whose opposed faces contain conductive layers, and one of which plates is a flexible diaphragm of low mechanical hysteresis. The transducer is coupled to a variable pressure source which under normal operating conditions remains at a substantially constant pressure level. The output signal from the transducer has its high-frequency AC component attenuated by a low-pass filter, whose output in turn has its DC component substantially removed by capacitive blocking, after which the remaining AC output is then amplified by a circuit including an operational amplifier. This AC-amplified signal is then compared with a "reduced-magnitude average" reference signal (produced by an AC-to-DC conversion side-circuit followed by magnitude-level adjustment). The comparator output triggers a one-shot monostable multivibrator used to produce an on-off switching signal which operates an alarm signal.

20 Claims, 4 Drawing Sheets

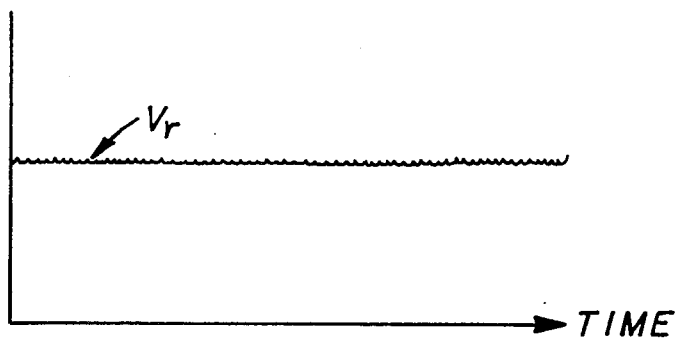
FIG. 3
PRESSURE (PSIG)
NORMAL
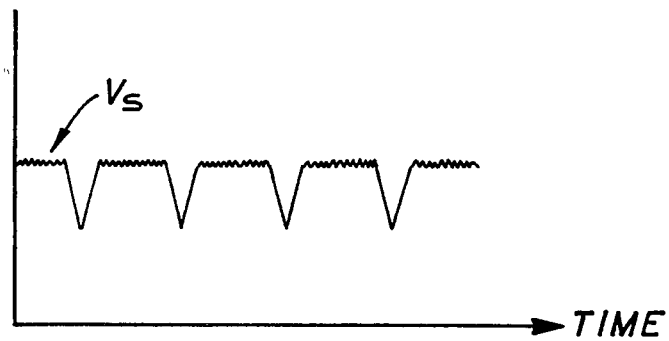
FIG. 4
PRESSURE (PSIG)
DISCONTINUITIES
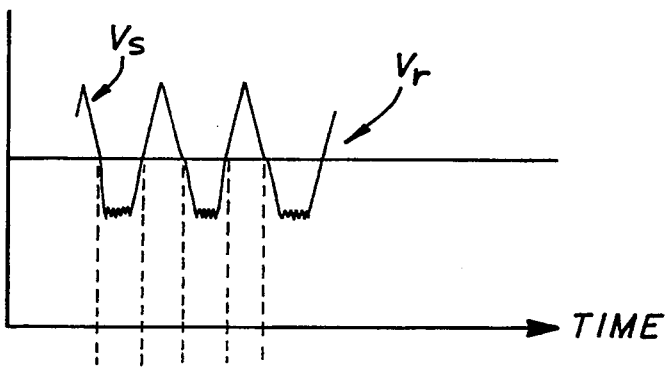
FIG. 5  $V_r, V_s$ INVERTED
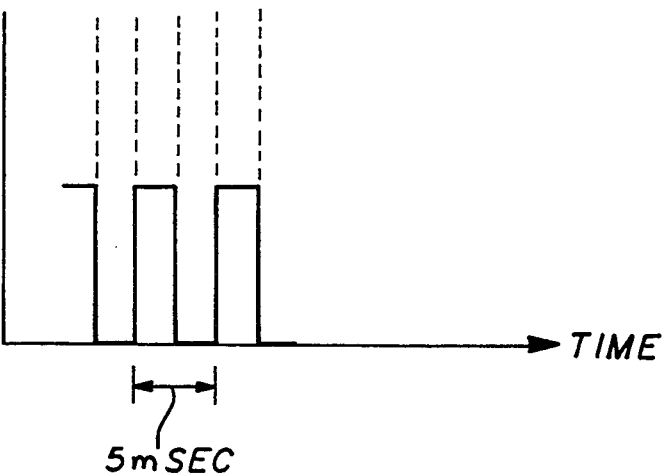
FIG. 6
COMPARATOR
OUTPUT
U5A, PIN 1

AMPLIFIER OUTPUT
NORMAL CONDITION (U6A, PIN 1)

AMPLIFIER OUTPUT
ABNORMAL CONDITION (U6A, PIN 1)

SYSTEM FOR COMPARING A REFERENCE SIGNAL WITH A FILTERED SIGNAL TO DETECT PRESSURE DISCONTINUITY

FIELD OF THE INVENTION

This invention relates to practical detection of large abrupt changes in magnitude, called discontinuities, of fluid pressure in mechanical systems involving gasses or liquids.

BACKGROUND OF THE INVENTION

Many systems (such as electrically-operated heat-pump air-conditioning systems and natural-gas powered heating and air-conditioning systems), industrial processes (such as petro-chemical refining processes or steam-boiler systems), and various pumping systems, involve the use of flowing gases or liquids which under normal operating conditions have pressure levels that are substantially constant or that vary within relatively small ranges. Thus, a discontinuity in such a fluid pressure level is indicative of some kind of malfunction, which for safety or efficiency reasons should be detected whenever it occurs, in order that appropriate correction measures may be taken.

Accordingly there has been a need for a simple, compact, reliable and inexpensive real-time pressure discontinuity analysis system capable of detecting such discontinuities and alerting either a human operator or another automatic correction system to the occurrence of a pressure discontinuity.

While relatively expensive alarm systems of this type are known, these tend to be complicated and to operate by indirect sensing methods which require sophisticated data-processing procedures and techniques in order to be of practical utility. For example, the "Method of and System for Detecting Misfire in Internal Combustion Engine" U.S. Pat. No. 4,083,234, issued Apr. 11, 1978 (and assigned to Nissan Motor Co., Ltd. of Japan), involves two separate indirect transducers, namely an acoustic transducer, such as an earphone receiver placed near the output of the engine exhaust gas, together with a rotary electromechanical engine-speed responsive frequency generator which produces a frequency variable proportional to the output speed of the engine. Furthermore, the signals from these two separate transducers must be processed by a fairly complicated electromechanical frequency analyzer (involving four separate band-pass filters, and two rotary contact mechanical elements operated at variable frequencies dependent upon engine speed).

Accordingly there has been a need for a more direct pressure-discontinuity analysis system, which utilizes only one transducer, namely a pressure transducer, and which operates successfully regardless of the values of other related variables (such as engine speed, in the case of automobile engine misfiring detection systems).

Also there has been a need for an analysis system which does not include any rotating mechanical parts, and whose mechanical aspects are limited to the simple flexing of a diaphragm of low mechanical hysteresis, which simplification greatly improves reliability and extends lifetime durability without need of scheduled service and essentially eliminates the possibility of breakdown-mandated repairs.

SUMMARY OF THE INVENTION

In accordance with the principles of the present invention, there is provided a simple, reliable, compact and inexpensive fluid pressure discontinuity analysis system which includes a single basic capacitive pressure transducer, made of two closely spaced insulating plates whose opposed faces contain conductive layers, and one of which plates is a flexible diaphragm of low mechanical hysteresis. The transducer is coupled to a variable pressure source which under normal operating conditions remains at a substantially constant pressure level. The output signal from the transducer has its high-frequency alternating current (AC) component attenuated by a low-pass filter, whose output in turn has its direct current (DC) component substantially removed by capacitive blocking, after which the remaining AC output is then amplified by a circuit which may include an operational amplifier. This AC-amplified signal is then compared with a "reduced-magnitude average" reference signal (produced by an AC-to-DC conversion side-circuit followed by magnitude-level adjustment). The comparator output triggers a one-shot monostable multivibrator used to produce an on-off switching signal which operates an LED alarm signal.

In accordance with a further aspect of the invention, a pressure discontinuity analysis system includes a pressure transducer for providing electrical signals corresponding to input pressure, a comparator and a detection use circuit. Applied to the inputs of the comparator are an AC signal corresponding to the AC component of the output of the pressure transducer, and a DC reference signal which is a function of the average magnitude of the AC component of the output of the pressure transducer. Circuitry is also provided for energizing the detection use circuit only when a pressure discontinuity occurs, causing the AC component to exceed a predetermined level.

Other objects, features, and advantages will become apparent from a consideration of the following detailed description and from the accompanying drawings.

BRIEF DESCRIPTION OF THE DRAWINGS

FIG. 3 is a typical measurement of normal fluid pressure as a function of time, illustrating minor fluctuations in a substantially constant level of pressure;

FIG. 4 is a time-plotted measurement of abnormal fluid pressure in the presence of level discontinuities, such as by a repeated malfunction in a pumping device;

FIG. 5 is a plot versus time of a reference voltage representing average pressure, and a signal representing pressure, including pressure discontinuities;

FIG. 6 is a plot versus time of the corresponding output of a comparator of a reference signal and a filtered pressure signal;

DETAILED DESCRIPTION

Figures 1, 2:
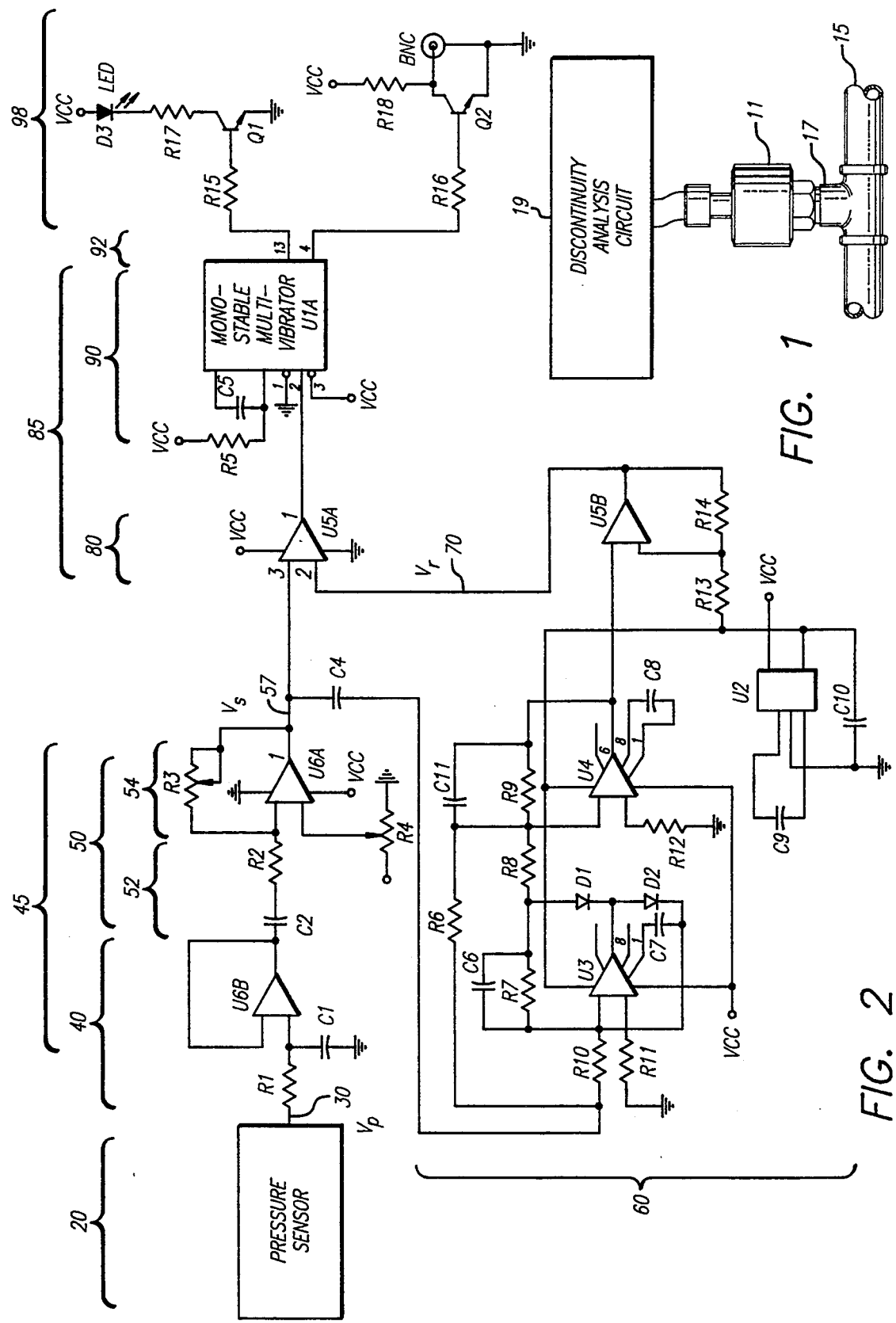
FIG. 1 is a partly schematic perspective view of a discontinuity analysis system illustrating the principles of the invention.
FIG. 2 is a schematic diagram of the discontinuity analysis system of FIG. 1.

Referring more particularly to the drawings, FIG. 1 shows a cylindrical pressure transducer 11 coupled to a fluid-carrying pipe 15 by a Tee-joint 17 and providing electrical output signals to the discontinuity analysis circuit 19 shown in greater detail in FIG. 2.

In the preferred embodiment of the present invention, the transducer is of the type of a capacitive pressure transducer, such as are manufactured by Kavlico Corp., 14501 Los Angeles Ave., Moorpark, CA 93021 under such patents as U.S. Pat. No. 4,329,732, issued May 11, 1982 to Fred Kavli et al for "Precision Capacitance Transducer," and U.S. Pat. No. 4,388,668, issued Jun. 14, 1983 to Fred Kavli et al for "Capacitive Pressure Transducer." In these transducers there is an insulating plate closely spaced from a flexible insulating diaphragm of low mechanical hysteresis. The plate and diaphragm are coated on facing surfaces with a conductive layer; thus the capacitance between the plate and the diaphragm varies with the diaphragm's flexing, which is proportional to changes in the fluid pressure on the non-coated side of the diaphragm. This type of sensor is preferred because of its superior signal to noise ratio and because of its tailored time response characteristics. The sensor response time is roughly 5 to 10 milliseconds, which indicates that it would take about 5 to 10 milliseconds to shift 63% of the way from indicating one pressure level to indicating a new pressure level.

The output waveform of such a sensor in a normally running fluid pressure system (such as in an automobile exhaust gas output stream) is presented in FIG. 3.

The same sensor, with abnormal pressure conditions (such as are produced by an engine misfiring), gives the output waveform presented in FIG. 4.

Figure 9:
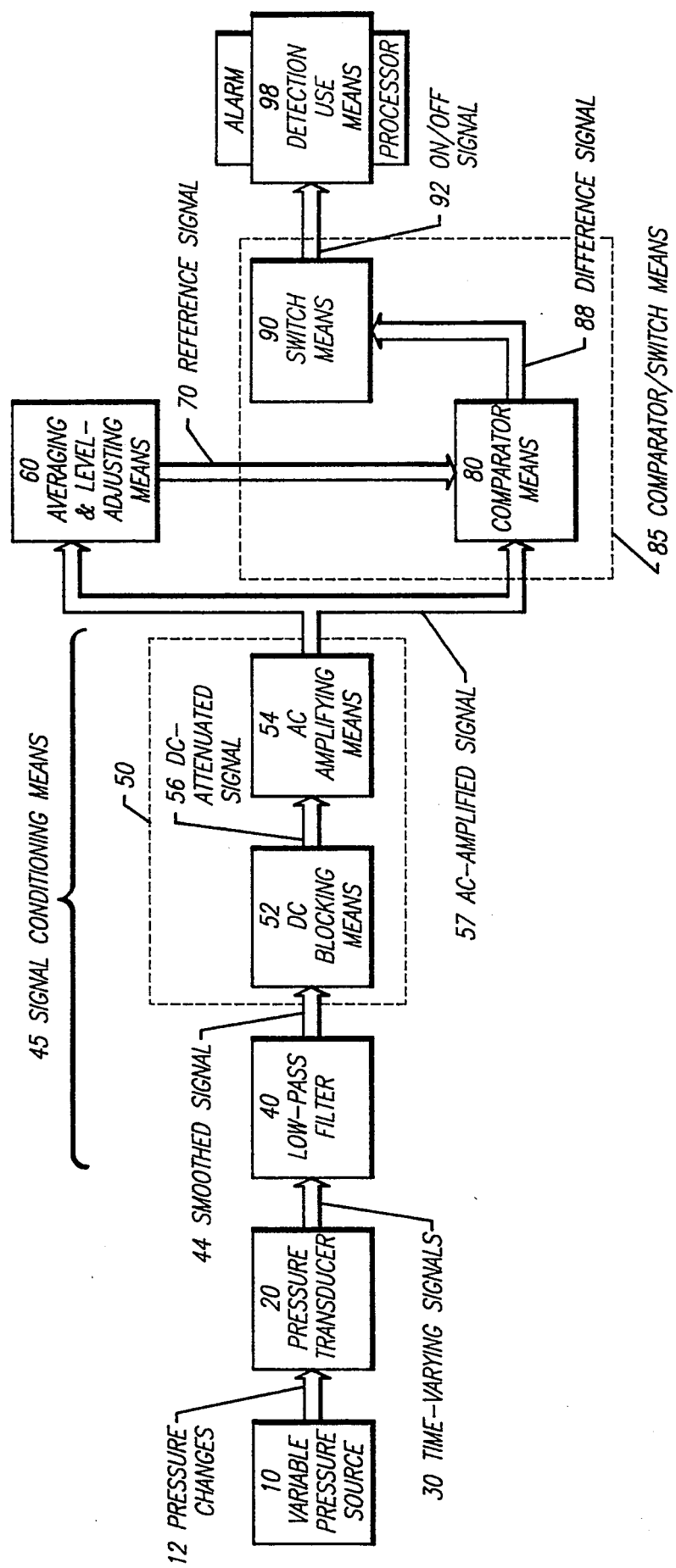
FIG. 9 is a schematic block diagram which depicts the information-theoretic architecture of the analysis system of FIG. 2.

Before discussing the particular details of the pressure discontinuity analysis circuit provided in FIG. 2, it may be helpful to the reader to consider the information-flow architecture of this circuit as presented in block-diagram form in FIG. 9. Here a variable pressure source 10 presents pressure changes 12 to a pressure transducer (or sensor) 20 (also shown in FIG. 2) whose output consists of time-varying electrical signals 30. These signals are operated on by low-pass filter 40, which suppresses any extraneous high-frequency oscillations which may be present. The resultant smoothed signal is passed to a signal-conditioning means 50 (also shown in FIG. 2), which consists of DC blocking means 52, producing a DC-attenuated signal 56, which is the input to AC-amplifying means 54. The result is the AC-amplified signal 57, which is both the input to comparator means 80 and averaging-and-level-adjusting means 60. The adjusted average provides reference signal 70, which is compared with AC-amplified signal 57 by comparator circuit 80. The difference signal 88 triggers switch means 90, which provides on/off signal 92 to detection use means 98. The preceding information-processing algorithm could be implemented by a digital filter or a hybrid digital-analog filter, but for simplicity and cost-effectiveness the preferred embodiment comprises the analog-circuit of FIG. 2, which will now be discussed in greater detail. (Operational amplifiers will be referred to as "op amps".)

The sensor output 30, denoted by "pressure voltage" $V_p$ as shown in FIG. 2, is filtered by a signal-conditioning circuit 45. In a presently preferred embodiment, this signal-conditioning circuit 45 comprises three sub-circuits: a low-pass filter 40, a DC-blocking filter 52, and an AC-amplifying circuit 54.

The low-pass filter 40 is comprised of resistor R1 (174 kilo-ohms) and capacitor C1 (0.1 micro-farads). The output of the low-pass filter is buffered by op amp U6B, and then subjected to the DC-blocking circuit 52, which is formed by capacitor C2 (0.47 micro-farads) and resistor R2 (200 kilo-ohms).

The resultant signal has its AC component amplified by the AC-coupled inverting amplifier 54 implemented by op amp U6A and its associated circuits, including resistors R3 (1 mega-ohm) and R4 (10 kilo-ohms).

The output 57 of the conditioning circuit 45, denoted by "signal voltage" $V_s$, is shown in FIG. 2 as providing an input to both a comparator subsystem 85 (which includes a comparator 80 and a mono-stable multivibrator 90) and an averaging side-circuit 60.

The side-circuit 60 uses an AC-to-DC conversion circuit as a means of averaging the AC signal $V_s$ 57 to produce a reference signal 70, denoted by "reference voltage" $V_r$, which is the other input to the comparator 80. The side-circuit 60 includes capacitors C4 (4.7 micro-farads), C6 (10 pico-farads), C7 (150 pico-farads), C8 (30 pico-farads), C9 (10 micro-farads), C10 (10 micro-farads), and C11 (4.7 micro-farads), together with resistors R6 (20 kilo-ohms), R7 (20 kilo-ohms), R8 (10 kilo-ohms), R9 (22.6 kilo-ohms), R10 (20 kilo-ohms), R11 (15 kilo-ohms), R12 (6.2 kilo-ohms), R13 (9.7 kilo-ohms), and R14 (23 kilo-ohms), as well as voltage converter U2 and op amps U3, U4, and U5B, and diodes D1 and D2.

The comparator 80 is based upon op amp U5A, and its output is the input to the switch circuit 90 implemented by monostable multivibrator (one-shot) U1A, which produces an output voltage pulse at the collectors of transistors Q1 and Q2 for every occurrence of a pressure discontinuity detection. The pulse duration is determined by the timing components of circuit 90, namely resistor R5 (50 kilo-ohms) and capacitor C5 (10 nano-farads) o The output resistors R15 and R16 are both of 10 kilo-ohms resistivity. The resistor R17 (200 kilo-ohms) precedes diode D3, which is a Light Emitting Diode (LED) and which is illuminated for the duration of the pulse at transistor Q1. The resistor R18 (1 kilo-ohm) is connected to the collector of transistor Q2, whose output may be monitored by a digital filter or microprocessor as indicated by the output connector BNC.

As shown in FIG. 2, the sensor output $V_p$ is filtered by a low-pass filter 40, formed by R1 and C1, to attenuate very high-frequency oscillations of the type which may occur during normal operation and are of no consequence for discontinuity detection or reference level determination. The filtered signal is buffered by op amp U6B and coupled through capacitor C2 to an inverting amplifier U6A. AC coupling is used to block the DC level of the sensor. The gain of the amplifier 54 is set by resistor R3 to give a suitable peak-to-peak voltage at the output (U6A pin 1), the DC level at the output of the amplifier being set by resistor R4.

Figure 7:
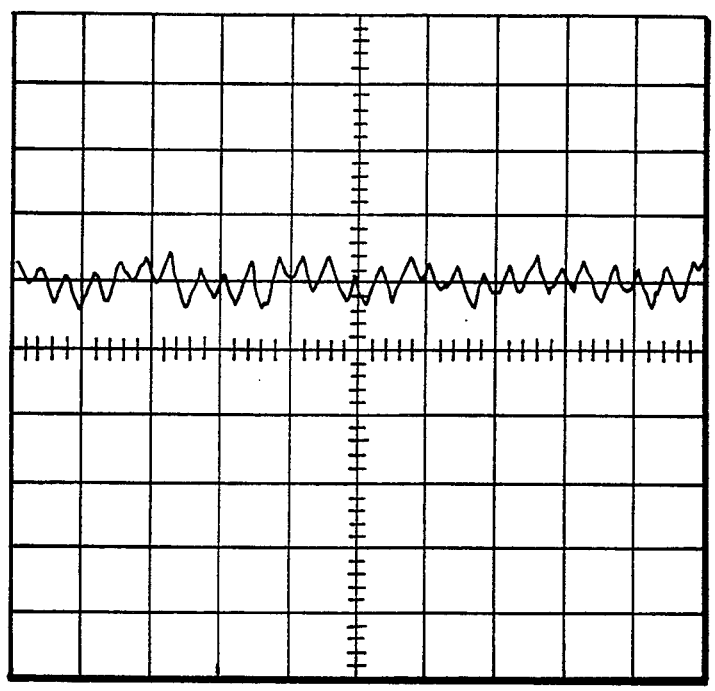
FIG. 7 is a plot versus time of a filtered pressure signal, measured during normal pressure conditions.
Figure 8:
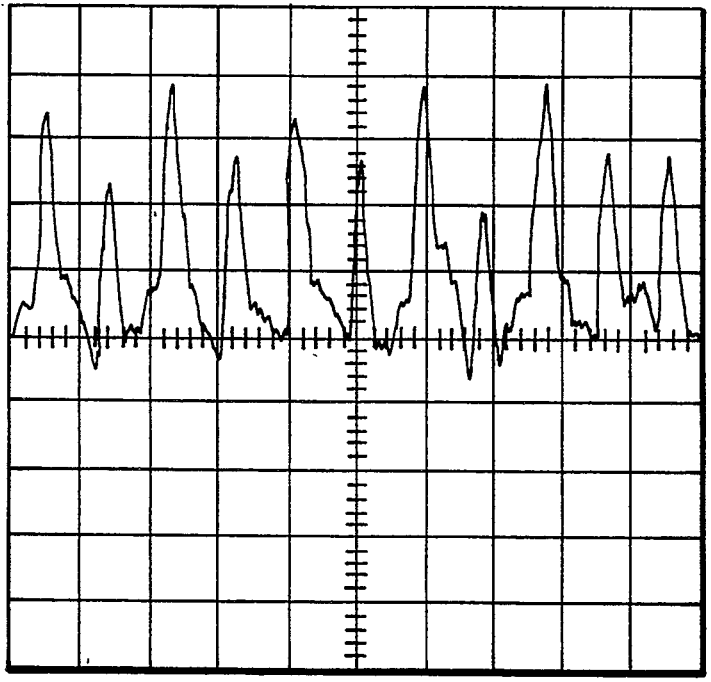
FIG. 8 is the same as FIG. 7 except that the measurement has been done during abnormal pressure conditions.

The output $V_s$ of the amplifier U6A, shown in the plots of FIGS. 7 and 8, is applied to the non-inverting input of the comparator 80 (U5A pin 3). The same signal $V_s$ is coupled via capacitor C4 to an AC-to-DC converter circuit. The DC output of this circuit, appearing on pin 6 of U4, is level-shifted by op amp U5B and then applied on lead 70 to the inverting input of the comparator 80 (U5A pin 2) to serve as a reference voltage $V_r$. The comparator output (U5A pin 1) acts as a trigger for the monostable multivibrator U1A. The one-shot circuit U1A produces a pulse output on output pins 4 and 13 on every positive-going voltage transition on its input on pin 2.

For the case of normal operating conditions, not shown in the plots of the drawings, the signal $V_r$ is lower than the bottom peak of $V_s$, and the output of the comparator 80 stays high and there is no output from the one-shot. This would correspond to a plot of the type of FIG. 5 wherein the inverted signal $V_s$ would be represented by a fluctuating but almost constant-level straight line beneath the inverted reference signal $V_r$; in this case, the comparator 80 would never send an output pulse.

For abnormal conditions, involving a pressure discontinuity, the amplitude of $V_s$ is larger, causing $V_r$ to increase and the bottom peak of $V_s$ to move lower as shown in FIG. 5 and the corresponding FIG. 6, wherein the pulse-width is about 0.5 milliseconds and the time between rising pulse edges is about 5 milliseconds in one example tested (misfiring automobile engine at 6,000 rpm). At the crossover points of signal voltage $V_s$ and reference voltage $V_r$ the comparator switches state, producing a square wave at its output. The positive-going pulse on output pin 13 of the circuit U1A turns transistor Q1 to its ON state, lighting up the LED for the duration of the pulse. This blink of the LED serves as a visual indicator of the abnormal pressure discontinuity event. The negative-going pulse on output pin 4 of circuit U1A is inverted by transistor Q2 to produce a positive-going pulse at its collector. This pulse can be monitored by a central processor coupled to the output collector labeled BNC.

In conclusion, it is to be understood that the foregoing detailed description, and the accompanying drawings relate to the presently preferred illustrative embodiment of the invention. However, various changes may be made without departing from the spirit and the scope of the invention. Thus, by way of example and not of limitation, the transducer per se may be made of other materials than those mentioned hereinabove. Furthermore, it is possible to use a variable-resistivity sensor instead of a variable-capacitance sensor; for example, the facing surfaces of the plate and diaphragm can be coated with film resistive layers whose resistivity changes as the diaphragm is flexed. In addition, the parts need not have the precise configuration described hereinabove, but may have alternative arrangements. Further, instead of the structural parts being made of metal, they may in many cases be formed of high strength composite materials. The analog circuit of FIG. 2 may be replaced by a functionally equivalent hybrid analog-digital filter or purely digital filter having the same information-theoretic architecture, as depicted in FIG. 9. Also a threshold device can be inserted between the comparator and the monostable multivibrator, in order to reduce the detection sensitivity to minor pressure discontinuities; and this threshold device can be operated either upon an absolute threshold level-setting, or upon a relative level-setting which depends upon the level of the reference signal and varies as that signal varies; and such a circuit could be used to supplement or in place of the circuit 60 of FIG. 9. Accordingly, it is to be understood that the detailed description and the accompanying drawings as set forth hereinabove are not intended to limit the breadth of the present invention, which should be inferred only from the following claims and their appropriately construed legal equivalents, rather than from the example given.

What is claimed is:

1. A real-time pressure discontinuity analysis system, applicable to a fluid pressure which, except for small magnitude fluctuations, is normally substantially constant or within a narrow range, comprising:
   pressure transducer means for converting pressure changes into time-varying electrical signals, comprising a capacitive pressure transducer, including an insulating plate and an insulating diaphragm, having facing sides coated with a conductive layer, said transducer having a time constant in the range of 8 to 12 milliseconds;
   low-pass filter means, said signals being applied to said low-pass filter means for suppressing high-frequency oscillations, thereby producing a filtered signal;
   direct current (DC) blocking means, coupled to the output of said low-pass filter means for substantially removing the direct current component of said filtered signal;
   alternating current (AC) amplifying means, coupled to the output of said DC blocking means for amplification of the alternating current component of said filtered signal thereby producing an output AC signal;
   reference signal producing means coupled to the output of said AC amplifying means for generating a DC reference signal proportional to an average magnitude of said filtered signal during normal continuous variation of said pressure, by the combination of AC-to-DC conversion means used as averaging means together with subsequent level-adjusting means, whereby said DC reference signal is chosen to be smaller in magnitude than the actual magnitude of said average magnitude of said filtered signal;
   comparator means, having a first input coupled to said AC amplifying means and a second input coupled to said reference signal producing means, for comparing the output AC signal of said AC amplifying means with said DC reference signal, including detection of the algebraic sign of the difference between said output AC signal and said DC reference signal and production of an output pulse whose magnitude is not zero when said difference has a selected sign and whose magnitude is zero when said difference has the opposite sign, and providing an output pulse whenever said magnitude of said output signal changes from zero to a selected polarity, thereby indicating that a significant pressure discontinuity occurs;
   bistable switch means for providing an on-off signal, coupled to an output of said comparator means and providing an on-off signal of preselected duration when an output pulse signal is received from said comparator means; and
   detection use means coupled to said bistable switch means for providing a detection use signal upon operation of said bistable switch means.

2. The real-time pressure discontinuity analysis system of claim 1 wherein said detection use means comprises alarm means triggered by the on state of said bistable switch.

3. The real-time pressure discontinuity analysis system of claim 2 wherein said alarm means includes a light-emitting diode.

4. The real-time pressure discontinuity analysis system of claim 2 wherein said alarm means involves a signal applied to the input of a digital processor which includes memory storage means for retention of the information from said alarm means.

5. A pressure discontinuity analysis system, applicable to a fluid pressure which, except for small magnitude fluctuations, is normally substantially constant or within a narrow range, comprising:

pressure transducer means for converting pressure changes into time-varying electrical signals;

low-pass filter means, said signals being applied to said low-pass filter means for suppressing high-frequency oscillations, thereby producing a filtered signal;

direct current (DC) blocking means, coupled to the output of said low-pass filter means for substantially removing the direct current component of said filtered signal;

alternating current (AC) amplifying means, coupled to the output of said DC blocking means for amplification of the alternating current component of said filtered signal thereby producing an output AC signal;

reference signal producing means coupled to the output of said AC amplifying means for generating a time-varying reference signal proportional to an average magnitude of said filtered signal during normal continuous variation of said pressure;

comparator means having a first input coupled to said AC amplifying means and a second input coupled to said reference signal producing means, for comparing the output AC signal of said AC amplifying means with said reference signal of the reference signal producing means, said comparator means also for producing an output pulse when a significant pressure discontinuity occurs;

bistable switch means for providing an on-off signal, coupled to the output of said comparator, and providing an on-off signal when an output pulse is received from said comparator; and detection use means coupled to said bistable switch means for providing a detection use signal upon operation of said bistable switch means.

6. The pressure discontinuity analysis system of claim 5 wherein said detection use means comprises alarm means triggered by the on state of said bistable switch.

7. The pressure discontinuity analysis system of claim 6 wherein said alarm means includes a light-emitting diode.

8. The pressure discontinuity analysis system of claim 6 wherein said alarm means involves a signal applied to the input of a digital processor which includes memory storage means for retention of the information from said alarm signal.

9. The pressure discontinuity analysis system of claim 5 wherein said reference signal producing means includes op amp means for level-adjusting said time-varying reference signal.

10. The pressure discontinuity analysis system of claim 5 operated as a closed-loop analysis system, wherein said reference signal is produced by the combination of AC-to-DC conversion means used as averaging means together with subsequent level-adjusting means, whereby said reference signal is chosen to be different in magnitude than the actual magnitude of said average magnitude of said filter signal.

11. The pressure discontinuity analysis system of claim 5 wherein said pressure transducer means comprises a capacitive pressure transducer, including an insulating plate and an insulating diaphragm, having facing sides coated with a conductive layer.

12. The pressure discontinuity analysis system of claim 11 wherein the time-constant of said transducer is selected within the range of 8 to 12 milliseconds.

13. The pressure discontinuity analysis system of claim 11 wherein said plate and said diaphragm are spaced apart between 0.001 and 0.0015 inches, and wherein said diaphragm is selected to be relatively thick, of about 0.0145 inches thickness, said thickness providing said transducer with a faster response time for a given pressure and also providing some mechanical filtering in augmentation of said low-pass filter means.

14. A pressure discontinuity analysis system, applicable to a fluid pressure which, except for small magnitude fluctuations, is normally substantially constant or within a narrow range, comprising:

pressure transducer means for converting pressure changes to time-varying electrical signals;

signal conditioning means for suppressing direct current (DC) components while amplifying alternating current (AC) components of said signals, thereby producing a conditioned signal;

reference signal producing means coupled to the output of said conditioning means for generating a reference signal proportional to the average magnitude of said conditioned signal during normal continuous variation of said pressure;

circuit means, including a comparator having two inputs, including a first input coupled to said signal conditioning means and a second input coupled to said reference signal producing means, for comparing the conditioned signal of said signal conditioning means of said conditioning means with said reference signal, said circuit means further including a bistable switch comparator means for producing an output on-state signal when a significant pressure discontinuity occurs, and wherein said circuit means is insensitive to minor pressure and corresponding signal variations but produces an output on-state signal upon major pressure discontinuities; and detection use means coupled to said circuit means for providing a detection use signal upon reception of said output on-state signal from said circuit means.

15. The pressure discontinuity analysis system of claim 14 wherein said detection use means comprises alarm means triggered by an output on-state signal from said bistable switch comparator means.

16. The pressure discontinuity analysis system of claim 15 wherein said alarm means includes a light-emitting diode.

17. The pressure discontinuity analysis system of claim 15 wherein said alarm means involves a signal applied to the input of a digital processor which includes memory storage means for retention of the information from said alarm signal.

18. The pressure discontinuity analysis system of claim 14 wherein said circuit means includes an open-loop configuration.

19. The pressure discontinuity analysis system of claim 14 operated as a closed-loop analysis system, wherein said reference signal is produced by the combination of AC-to-DC conversion means used as averaging means together with subsequent level-adjusting means, whereby said reference signal is chosen to be different in magnitude than the actual magnitude of said average.

20. The pressure discontinuity analysis system of claim 14 wherein said pressure transducer means comprises a capacitive pressure transducer, including an insulating plate and an insulating diaphragm, having facing sides coated with a conductive layer.

* * * * *